(12) United States Patent
Asensio Nieto et al.

(10) Patent No.: US 10,514,318 B2
(45) Date of Patent: Dec. 24, 2019

(54) METHOD FOR ADAPTIVELY CANCELLING IN REAL TIME ELASTIC MODES IN DISCRETE-TIME SIGNALS

(71) Applicant: AIRBUS DEFENCE AND SPACE, S.A.U., Getafe (ES)

(72) Inventors: Francisco José Asensio Nieto, Getafe (ES); Rodney Rodriguez Robles, Getafe (ES); Alberto Sanz De Blas, Getafe (ES)

(73) Assignee: AIRBUS DEFENCE AND SPACE SAU, Getafe (ES)

( * ) Notice: Subject to any disclaimer, the term of this patent is extended or adjusted under 35 U.S.C. 154(b) by 276 days.

(21) Appl. No.: 15/713,916

(22) Filed: Sep. 25, 2017

(65) Prior Publication Data
US 2018/0088000 A1    Mar. 29, 2018

(30) Foreign Application Priority Data
Sep. 23, 2016 (EP) .................................. 16382445

(51) Int. Cl.
| | |
|---|---|
| *G01M 9/06* | (2006.01) |
| *G01M 5/00* | (2006.01) |
| *G05B 19/05* | (2006.01) |
| *G06F 17/11* | (2006.01) |
| *G01M 9/08* | (2006.01) |
| *B64C 17/00* | (2006.01) |

(52) U.S. Cl.
CPC ............ *G01M 9/06* (2013.01); *G01M 5/0016* (2013.01); *G01M 9/08* (2013.01); *G05B 19/054* (2013.01); *G06F 17/11* (2013.01); *B64C 17/00* (2013.01)

(58) Field of Classification Search
CPC ....... B64C 17/00; G01M 9/06; G01M 5/0016; G01M 9/08; G06F 17/11
See application file for complete search history.

(56) References Cited

U.S. PATENT DOCUMENTS

| | | | | |
|---|---|---|---|---|
| 4,480,480 A | * | 11/1984 | Scott ................... | E02B 17/0034 702/41 |
| 6,826,493 B1 | * | 11/2004 | Mangalam .............. | G01M 9/06 702/45 |
| 7,520,176 B1 | * | 4/2009 | Ko ....................... | G01M 5/0016 73/794 |

(Continued)

OTHER PUBLICATIONS

"Reduced-Order Modeling and Flutter Suppression Control of an Experimental Wing", Kai-Yew Lum et al., Jul. 6, 2016.

(Continued)

*Primary Examiner* — Christopher P Ellis
(74) *Attorney, Agent, or Firm* — Greer, Burns & Crain, Ltd.

(57) ABSTRACT

A method of aeroservoelastic coupling suppression, and particularly, the field of real time adaptive cancellation of elastic modes in discrete-time signals which measure the dynamics of a flexible structure. The flexible structure comprises a structure with elastic variable characteristics, and more particularly, a structure with non-linear aerodynamics. A method is disclosed for adaptively cancelling, in real time, N elastic modes in discrete-time signals which measure the dynamics of the flexible structure. Also disclosed is a computer program implemented on a computing device, a system and an aircraft implementing the mentioned method.

8 Claims, 5 Drawing Sheets

(56) References Cited

U.S. PATENT DOCUMENTS

| | | | | |
|---|---|---|---|---|
| 7,715,994 B1* | 5/2010 | Richards | ............. | G01M 5/0016 |
| | | | | 702/42 |
| 9,073,623 B1* | 7/2015 | Suh | ........................ | B64D 45/00 |
| 9,574,457 B2* | 2/2017 | Skovby | ............... | G01M 5/0016 |
| 9,746,392 B2* | 8/2017 | Hinnant, Jr. | ......... | G01M 5/0016 |
| 2007/0096979 A1* | 5/2007 | Hinnant, Jr. | ......... | G01M 5/0016 |
| | | | | 342/357.22 |
| 2009/0309762 A1* | 12/2009 | Wolcken | ................ | B64D 45/00 |
| | | | | 340/945 |

OTHER PUBLICATIONS

"Adaptive Mode Suppression for Aeroelastic Hypersonic Vehicle", Zhongjie et al., 2011.

* cited by examiner

METHOD FOR ADAPTIVELY CANCELLING IN REAL TIME ELASTIC MODES IN DISCRETE-TIME SIGNALS

CROSS-REFERENCES TO RELATED APPLICATIONS

This application claims the benefit of the European patent application No. 16382445.1 filed on Sep. 25, 2017, the entire disclosures of which are incorporated herein by way of reference.

TECHNICAL FIELD OF THE INVENTION

The present invention belongs to the field of aeroservoelastic coupling suppression, and particularly, it belongs to the field of real time adaptive cancellation of elastic modes in discrete-time signals which measure the dynamics of a flexible structure.

In particular, the flexible structure is a structure with elastic variable characteristics, and more particularly, a structure with non-linear aerodynamics.

BACKGROUND OF THE INVENTION

Along the aerospace history, there are many incidents that have emphasized the important role that aeroservoelastic coupling plays in the stability of controlled vehicles. The instability and handling qualities degradation is to be avoided by suppressing the structural elastic modes (aeroservoelastic coupling suppression) in the feedback paths of the Control Laws.

The Control Laws are any law which is a function of the measured system dynamics, and which governs the movement of the system control devices or effectors, being the effectors of any device intended to modify the movement or displacement of a system.

Aeroservoelastic coupling suppression is a multidisciplinary technology dealing with the interaction of air vehicle non-stationary aerodynamic forces, the structure dynamics and the flight control system dynamics. Several studies have been conducted assessing strategies and methodologies in the design of active flight control algorithms to favorably modify the aeroelastic dynamics of the system, or to simply decouple the rigid and elastic measured dynamics to minimize the adverse effects on the stability margins and handling qualities.

In the particular case of controlled systems with a very flexible structure, it is a normal practice to apply filtering techniques as, i.e., notch filters for removing the elastic modes from the feedback signals. This known technique is suitable for systems with medium to high elastic modes frequencies, in such a way that the elastic mode frequencies lie outside of the control frequency bandwidth of the augmented system.

In the particular case of the flying boom installed in a tanker aircraft, the flying boom is a flexible slender structure with highly non-linear aerodynamics and elastic characteristics that strongly vary with the flight condition, the operational phase, the telescopic beam length and the fuel flow. The first bending mode frequency of the flying boom, both in free-air and coupled conditions (during refueling operations), lies in the bandwidth of the rigid control frequencies.

Alternative solutions to the notch filter for very flexible systems which meet the design requirements are also known. For example, extended Kalman filters can be applied to attenuate the elastic components in the feedback signals at the resonant frequencies using the theoretic model of the rigid system. Additionally, it is known to use a spatial filtering technique that uses a distributed sensor array to cancel the elastic modes components in the feedback signal, assuming the elastic modes shapes are known beforehand. Nevertheless, the number of sensors used in a spatial filtering technique is, in general, greater than twice the number of elastic modes to be suppressed.

These known alternative solutions, as model-based filtering methods, conventionally lack of robustness and adaptation capabilities against plant uncertainties, cannot cope with fast changes in the structure morphology, and their performance is very sensitive to variations in the exogenous boundary conditions acting on the system. Thus, it is essential to perform an alternative method that minimizes the impact on the sensed rigid dynamics component to fulfill the handling quality level and stability margins requirements; and to achieve a robust online cancellation of the elastic modes in the feedback signals using a non-model-based approach.

SUMMARY OF THE INVENTION

In a first inventive aspect, the invention provides a method for adaptively cancelling in real time N elastic modes in discrete-time signals which measure the dynamics of a flexible structure, the flexible structure having elastic variable characteristics, and the method comprising two main blocks:

the first block of the method comprising the following steps:

providing a total number $N \in \mathbb{N}^+$ of elastic modes to be cancelled, being i a generic elastic mode to be cancelled, $i \in \mathbb{N}^+$: $i \in [1, N]$, and two active measurement sources (A, B) whose location is respectively defined by location vectors $1_A$ and $1_B$, where $1_A, 1_B \in \mathbb{R}^3$, sampling two output measurement discrete-time scalar signals $y^A$ and $y^B$ of the dynamics of the flexible structure, being $y_n^A$ and $y_n^B$, the $n^{th}$ sample of the respective signal measured by the two active measurement sources (A, B), the sampling being performed with a sample time $\Delta t$, and the $n^{th}$ sample of a signal being $n \in \mathbb{N}^+$: $n \in [1, \infty)$, providing a natural frequency estimate $\hat{\omega}_{n-1}^i$ of the elastic mode i, and an integer parameter $M_{n-1}^i$, being the frequency estimate and the parameter respectively:

c1) if n=1; then $\hat{\omega}_{n-1}^i = \hat{\omega}_0^i$; $M_{n-1}^i = M_0^i$, being $M_0^i$ an integer multiple of $$\left\lfloor \frac{2\pi}{\hat{\omega}_0^i \Delta t} \right\rfloor,$$

being the method applied for the first time, c2) if n≠1; then $\hat{\omega}_{n-1}^i = \hat{\omega}_{n-1}^i$; $M_{n-1}^i = M_{n-1}^i$, being $M_{n-1}^i$ an integer multiple of $$\left\lfloor \frac{2\pi}{\hat{\omega}_{n-1}^i \Delta t} \right\rfloor,$$

filtering the output measurement discrete-time scalar signals $y^A$ and $y^B$, by means of a conditioning filter $H_c^i$, obtaining filtered measurement outputs for the elastic mode i, $y^{A,i}$ and $y^{B,i}$, calculated by the following expressions in the Z-domain:

$$Y^{A,i}(z) = H_c^i(z) y^A(z)$$

$$Y^{B,i}(z) = H_c^i(z) y^B(z)$$

wherein $H_c^i(z)$ corresponds to the transfer function in the Z-domain of the conditioning filter $H_c^i$, the conditioning filter being a parametric band-pass digital filter centered at the frequency estimate $\hat{\omega}_{n-1}^i$ of the elastic mode i provided in step c), obtaining an $n^{th}$ sample of an estimated cancellation parameter per elastic mode i to be cancelled, $\hat{K}_n^i$, according to the following expression:

$$\hat{K}_n^i = \frac{\sum_{j=n-M_{n-1}^i+1}^{n}\left((Y_j^{B,i})^2 - Y_j^{A,i}Y_j^{B,i}\right)}{\sum_{j=n-M_{n-1}^i+1}^{n}\left((Y_j^{A,i})^2 + (Y_j^{B,i})^2 - 2Y_j^{A,i}Y_j^{B,i}\right)}$$

wherein the value of the parameter $M_{n-1}^i$ corresponds to the value provided in step c), generating an $n^{th}$ sample of a discrete-time scalar signal $y^X$, namely $y_n^X$, according to the following expression:

$$y_n^X = \hat{K}_n^i y_n^A + (1-\hat{K}_n^i)y_n^B$$

obtaining a filtered discrete-time scalar signal $Y^F$ by means of the following bank filtering expression in the Z-domain:

$$y^F(z) = y^X(z)H_1(z) + y^A(z)(1-H_1(z))$$

wherein $H_1$ is a second order band-pass filter centered in the natural frequency estimate $\hat{\omega}_{n-1}^i$ of the elastic mode i provided in step c), and obtaining directly from the filtered discrete-time scalar signal $y^F$ an $n^{th}$ sample of the filtered discrete-time scalar signal $y^F$, namely $Y_n^F$, obtaining an $n^{th}$ sample of an estimate of the mode displacements for each elastic mode i, $\hat{\gamma}_n^i$, by means of the following expression:

$$\hat{\gamma}_n^i = y_n^A - Y_n^F$$

calculating an adjusted value of $\hat{\omega}_{n-1}^i$, namely $\hat{\omega}_n^i$, by introducing the value of $\hat{\gamma}_n^i$ from step h) in a frequency tracking module, obtaining the adjusted value $\hat{\omega}_n^i$, saving the adjusted value $\hat{\omega}_n^i$ calculated in step i)

performing, from i=1 to i=N, the steps c) to j), the second block of the method comprising the following steps:

inheriting from step h) the values of the $n^{th}$ sample of the estimate of the mode displacements, $\hat{\gamma}_n^i$ for each elastic mode i, obtaining an $n^{th}$ sample of an elastic mode cancellation output function $Y_n^{output}$ according to the following expression:

$$Y_n^{output} = \theta_n^1 y_n^A + \theta_n^2 y_n^B + \sum_{j=1}^{N-1}\theta_n^{j+2}\hat{\beta}_n^j == \begin{bmatrix} y_n^A & y_n^B & \hat{\beta}_n^1 & \hat{\beta}_n^2 & \cdots & \hat{\beta}_n^{N-1}\end{bmatrix}\begin{bmatrix}\theta_n^1 \\ \vdots \\ \theta_n^N \\ \theta_n^{N+1}\end{bmatrix}$$

the $n^{th}$ sample of the elastic mode cancellation output function $Y_n^{output}$ being obtained by the following steps:

m1) calculating the inverse of an estimated spatial filter matrix $\hat{\Phi}$ by the following expression:

$$\hat{\Phi}^{-1} = \left(\begin{bmatrix} 1 & 1 & 1 & 1 \\ \hat{K}_n^1 & \cdots & \hat{K}_n^N & 1 \\ \hat{K}_n^1 - 1 & \cdots & \hat{K}_n^N - 1 & 1 \\ 1-\lambda_n^{1,1} & \cdots & 1-\lambda_n^{N,1} & 1 \\ \vdots & \ddots & \vdots & \cdots \\ 1-\lambda_n^{1,N-1} & \cdots & 1-\lambda_n^{N,N-1} & 1 \end{bmatrix}^T\right)^{-1}$$

wherein:

$\hat{K}_n^i$ are values of the $n^{th}$ sample of the estimated cancellation parameter for each elastic mode i to be cancelled, inherited from step e)

$\lambda_n^{i,p}$, $p \in \mathbb{N}^+$: $p \in [1, N-1]$; $i \in \mathbb{N}^+$: $i \in [1, N]$, is an adjustable discrete-time parameter for each elastic mode i, selected to achieve a non-singular spatial filter matrix $\hat{\Phi}$, m2) calculating a spatial filter parameter vector $\theta_n \in \mathbb{R}^{N+1}$, wherein:

$$\theta_n = \begin{bmatrix}\theta_n^1 \\ \vdots \\ \theta_n^N \\ \theta_n^{N+1}\end{bmatrix} = \hat{\Phi}^{-1}\begin{bmatrix}0 \\ \vdots \\ 0 \\ 1\end{bmatrix}$$

m3) generating a set of N−1 parametric discrete-time virtual signals $\hat{\beta}^p$, being $\hat{\beta}_n^p$ the $n^{th}$ sample of the virtual signals $\hat{\beta}^p$, being $p \in \mathbb{N}^+$: $p \in [1, N-1]$, the $n^{th}$ sample of the virtual signals $\hat{\beta}_n^p$ configured for complementing $y_n^A$ and $y_n^B$ according to the following expression:

$$\hat{\beta}_n^p = y_n^A - \Sigma_{i=1}^N \lambda_n^{i,p}\hat{\gamma}_n^i$$

m4) substituting in the elastic mode cancellation output function $Y_n^{output}$ expression the values obtained in the previous steps k1)-k3), obtaining the value of the elastic mode cancellation output function $Y_n^{output}$ $$Y_n^{output} = \theta_n^1 y_n^A + \theta_n^2 y_n^B + \sum_{j=1}^{N-1}\theta_n^{j+2}\hat{\beta}_n^j == \begin{bmatrix} y_n^A & y_n^B & \hat{\beta}_n^1 & \hat{\beta}_n^2 & \cdots & \hat{\beta}_n^{N-1}\end{bmatrix}\begin{bmatrix}\theta_n^1 \\ \vdots \\ \theta_n^N \\ \theta_n^{N+1}\end{bmatrix}$$

cancelling the elastic modes i by means of the elastic mode cancellation output function $Y_n^{output}$, performing, from n=1 to n=∞, the steps b) to n), introducing the saved adjusted $\hat{\omega}_n^i$ values of step j) in step c).

Throughout this entire document, "adaptively" cancelling elastic modes will be understood as the capability of the method of adjusting the cancelling results when conditions such as the geometry of the flexible structure or the boundary conditions change.

Throughout this entire document, "flexible" structure will be understood as a structure with fast time-varying geometries and exogenous boundary conditions that can suffer discrete changes. Also, the flexible structure is provided with elastic variable characteristics, and in preferred embodiments with non-linear aerodynamics.

The discrete-time signals which measure the dynamics of a flexible structure comprise a total number N of elastic modes to be cancelled and, advantageously, the flexible structure comprises only two active measurement sources for cancelling all these elastic modes in the discrete-time signals, i.e., the output measurements signals obtained throughout different sampling operations. Compared with the state of the art, wherein there is need of having at least a number of N+1 of measurement sources, this method advantageously provides reliable results with only two measurement sources.

Thus, the present method uses the minimum information of the flexible structure for cancelling in real time the N selected elastic modes in the discrete-time signals, i.e., in the output measurement signals.

Both the number N of elastic modes and the two active measurement sources are provided by the step a) of the present method. Additionally, the step a) further provides the location vectors l of each active measurement source, depending the location vectors l on the spatial positioning of each measurement source on the flexible structure which elastic modes are to be cancelled in the discrete-time signals, i.e., in the output measurements, and the variation of the elastic characteristics of the flexible structure. The variations condition the locations of the measurement sources due to the fact that different positions of the measurement sources may affect the output measurements provided by the sources.

Both active measurement sources, namely sources A and B, are sources which indistinctly provide discrete samples of the measured system dynamics, which comprise the system rigid dynamics, the flexible structure dynamics, and the respective measurement noises and errors. Therefore, the user may decide which of the sources may be denoted as A or B. Results of the present method are indistinctly obtained whichever of the sources is considered to be source A or source B. However, the location of source A may affect the location of source B or vice versa.

In a preferred embodiment, once the location of the measurement source A is selected, the elastic modes iso-displacement points define the location where measurement source B shall not be placed in order to satisfactorily apply the proposed elastic mode cancellation method in the output measurement signals provided by measurement source A or B.

In a preferred embodiment, the measurement sources are sensors.

Throughout this entire document, "active" measurement sources will be understood as measurement sources which provide sampling results during the functioning of the present method. This does not exclude additional measurement sources which may be located in the flexible structure but which are not essential for performing the present method once two active measurement sources work in the flexible structure.

Advantageously, the present method allows the user to decide, depending on the needs or the functioning of structure, the real-time sampling by means of the two measurement sources, thus obtaining two output measurement discrete-time scalar signals as the ones provided in step b).

Throughout this entire document, "output measurement" will be understood as a signal, and, more particularly, a signal provided by any active measurement source arranged on the flexible structure.

Step c) of the present method provides the elastic natural frequency estimate of each elastic mode to be cancelled, a frequency which will be different depending on if the method is applied for the first time or not, i.e., if the method is performing the first sampling.

Thus, the method is provided in step c) with a natural frequency estimate $\hat{\omega}_{n-1}^i$, which in step c1) is known by the user or by previous results of application of the method, the frequency being $\hat{\omega}_0^i$; which is understood as the initial natural frequency estimate of the elastic mode i.

On the contrary, the natural frequency estimate $\hat{\omega}_{n-1}^i$ provided for step c2) is taken from previous results of adjustment or estimation of the natural frequency estimate of previous samples. Therefore, in this case:

$$\hat{\omega}_{n-1}^i = \hat{\omega}_{n-1}^i$$

That is, the natural frequency estimate needed is provided as the value inherited from previous samples on which the method has been already performed.

Advantageously, this allows the method to adjust the results as it is considering the different behavior stages of the flexible structure given an initial estimated value of these frequencies.

The present method additionally provides a conditioning filter which is a parametric band-pass digital filter that is centered at the frequency estimate of each elastic mode to be cancelled, the frequency which is previously provided in step c) of the method. Advantageously, the conditioning filter filters the output measurement discrete-time scalar signal, by means of a transfer function, in order to obtain filtered measurement outputs for each elastic mode to be cancelled.

Additionally, the conditioning filter of the present method enhances the performance and robustness of the cancelling method compared to current methods of spatial filtering of the state of the art.

The elastic natural frequencies are estimated and provided in real time, and the method allows generating a filtered signal which contains only the measured rigid dynamics of the flexible structure, with zero phase-loss and attenuation.

Concerning step g) of the present method, a second order band-pass digital filter that is centered in the natural frequency estimate of each elastic mode to be cancelled, which was previously provided in step c), is used. Advantageously, the second order band-pass digital filter filters the discrete-time scalar signals, which is part of a complementary filter bank, obtaining a filtered discrete-time scalar signal of each elastic mode to be cancelled. Additionally, the second order band-pass digital filter of the present method enhances the performance and robustness of the method compared to current methods of spatial filtering.

The present method additionally comprises the use of a frequency tracking module which in step i) estimates and updates the natural frequency of each elastic mode to be cancelled. The adjustment of this natural frequency is performed introducing the estimated mode displacements of each elastic mode in the frequency tracking module, and obtaining the estimated natural frequency updated values.

The previous updated values are saved in step j).

The inclusion of steps i) and j) allows the method to be readjusted every time it is run, therefore the results obtained are more reliable.

The present method additionally provides a loop in step k) which, advantageously, allows performing step c) to step j), as many times as the number N of elastic modes which are going to be cancelled. The loop, guarantees that the estimation process is done for every elastic mode to be canceled and also enhances the performance and robustness of the present method.

The present method additionally provides an elastic mode cancellation output function in step m) which, advantageously, allows the cancellation of each elastic mode to be cancelled in real time in the discrete-time signals which measure the dynamics of the studied flexible structure, taking into consideration the variable conditions and elastic properties of the flexible structure. For obtaining the output function, the present method additionally provides an extended spatial filtering. Advantageously, the extended spatial filtering is in charge of generating N−1 virtual signal for complementing the signals measured by the two active measurement sources in order to obtain the elastic mode cancellation output function.

The present method enhances the performance and robustness compared with methods of spatial filtering known from the state of the art, reducing also the development time and cost associated.

In a particular embodiment, the conditioning digital filter $H_c^i$ of step d) of the first inventive aspect is a combination of a narrow band-pass digital filter (BP) centered at $\hat{\omega}_{n-1}^i$ and one or two narrow stop-band digital filters (SB) centered at $\hat{\omega}_{n-1}^{i-1}$ and $\hat{\omega}_{n-1}^{i+1}$, and wherein $H_c^i(z)$ is the transfer function in the Z-domain of the conditioning digital filter $H_c^i$ corresponding to the following expression:

if $i=1$ $$H_c^i(z) = H_{BP}(z,\hat{\omega}_{n-1}^i) H_{SB}(z,\hat{\omega}_{n-1}^{i+1})$$

else, if $i=2,\ldots,N-1$ $$H_c^i(z) = H_{BP}(z,\hat{\omega}_{n-1}^i) H_{SB}(z,\hat{\omega}_{n-1}^{i-1}) H_{SB}(z,\hat{\omega}_{n-1}^{i+1})$$

else, if $i=N$ $$H_c^i(z) = H_{BP}(z,\hat{\omega}_{n-1}^i) H_{SB}(z,\hat{\omega}_{n-1}^{i-1})$$

and wherein step c) of the method further comprises providing natural frequency estimates $\hat{\omega}_{n-1}^{i-1}$ and $\hat{\omega}_{n-1}^{i+1}$ of the elastic mode i−1 and i+1, being:

c1) if $n=1$; then $\hat{\omega}_{n-1}^i = \hat{\omega}_0^i$; $\hat{\omega}_{n-1}^{i-1} = \hat{\omega}_0^{i-1}$; $\hat{\omega}_{n-1}^{i+1} = \hat{\omega}_0^{i+1}$; $\hat{\omega}_{n-1}^i = M_0^i$, being $M_0^i$ an integer multiple of $$\left\lfloor \frac{2\pi}{\hat{\omega}_0^i \Delta t} \right\rfloor,$$

being the method applied for the first time, c2) if $n \neq 1$; then $\hat{\omega}_{n-1}^i = \hat{\omega}_{n-1}^i$; $\hat{\omega}_{n-1}^{i-1} = \hat{\omega}_{n-1}^{i-1}$; $\hat{\omega}_{n-1}^{i+1} = \hat{\omega}_{n-1}^{i+1}$; $M_{n-1}^i = M_{n-1}^i$, being $M_{n-1}^i$ an integer multiple of $$\left\lfloor \frac{2\pi}{\hat{\omega}_{n-1}^i \Delta t} \right\rfloor,$$

Advantageously, the combination of a band-pass digital filter and one or two narrow digital stop-band filter provides a better adjustment of the natural frequency estimates.

In a more particular embodiment, the narrow band-pass digital filter is defined by a bandwidth $\Delta\omega_{BP}$ and the one or two narrow stop-band digital filters are defined by a bandwidth $\Delta\omega_{SB}$ respectively, following the expression:

if $i=1$ $$H_c^i(z) = H_{BP}(z,\hat{\omega}_{n-1}^i,\rho^i) H_{SB}(z,\hat{\omega}_{n-1}^{i+1},\rho^{i+1})$$

else, if $i=2,\ldots,N-1$ $$H_c^i(z) = H_{BP}(z,\hat{\omega}_{n-1}^i,\rho^i) H_{SB}(z,\hat{\omega}_{n-1}^{i-1},\rho^{i-1}) H_{SB}(z,\hat{\omega}_{n-1}^{i+1},\rho^{i+1})$$

else, if $i=N$ $$H_c^i(z) = H_{BP}(z,\hat{\omega}_{n-1}^i,\rho^i) H_{SB}(z,\hat{\omega}_{n-1}^{i-1},\rho^{i-1})$$

wherein $\rho$ is the filter depth of the conditioning digital filter $H_c^i$, fulfilling:

$$\rho^i = \Delta\omega_{BP}$$

$$\rho^{i-1} = \rho^{i+1} = \Delta\omega_{SB}$$

Advantageously, the filter width equals the band width of the filter. Higher values of band width imply higher filter width values; therefore, the filter can be selected according to the needs.

In a particular embodiment, the conditioning digital filter $H_c^i$ of step d) is a combination of a narrow band-pass digital filter (BP) centered at $\hat{\omega}_{n-1}^i$ and N−1 narrow stop-band digital filters (SB) centered at $\hat{\omega}_{n-1}^q$ being $q \in \mathbb{N}^+$: $\{q \in [1, N] | q \neq i\}$, being $H_c^i(z)$ the transfer function in the Z-domain of the conditioning digital filter $H_c^i$ corresponding to the following expression:

$$H_c^i(z) = H_{BP}(z,\hat{\omega}_{n-1}^i) \cdot \prod_{\substack{q=1 \\ q \neq i}}^{N} H_{SB}(z,\hat{\omega}_n^q)$$

and wherein step c) of the method further comprises providing natural frequency estimate $\hat{\omega}_{n-1}^i$ of the elastic mode i, and natural frequencies estimates of the rest of the elastic modes $\hat{\omega}_{n-1}^q$, with $q \in \mathbb{N}^+$: $\{q \in [1, N] | q \neq i\}$, being:

c1) if $n=1$; then $\hat{\omega}_{n-1}^i = \hat{\omega}_0^i$; $\hat{\omega}_{n-1}^q = \hat{\omega}_0^q$ with $q \in \mathbb{N}^+$: $\{q \in [1, N] | q \neq i\}$; $M_{n-1}^i = M_0^i$, being $M_0^i$ an integer multiple of $$\left\lfloor \frac{2\pi}{\hat{\omega}_0^i \Delta t} \right\rfloor,$$

being the method applied for the first time, c2) if $n \neq 1$; then $\hat{\omega}_{n-1}^i = \hat{\omega}_{n-1}^i$; $\hat{\omega}_{n-1}^q = \hat{\omega}_{n-1}^q$, with $q \in \mathbb{N}^+$: $\{q \in [1, N] | q \neq i\}$; $M_{n-1}^i = M_{n-1}^i$, being $M_{n-1}^i$ an integer multiple of $$\left\lfloor \frac{2\pi}{\hat{\omega}_{n-1}^i \Delta t} \right\rfloor,$$

Advantageously, the combination of a band-pass digital filter and N−1 narrow digital stop-band filters provides a better adjustment of the natural frequency estimates and a higher cancelation performance of the N elastic modes to be suppressed when the estimated elastic modes frequencies are very close to each other.

In a more particular embodiment, the narrow band-pass digital filter is defined by a bandwidth $\Delta\omega_{BP}$ and the N−1 narrow stop-band digital filters are defined by a bandwidth $\Delta\omega_{SB}$ respectively, following the expression:

$$H_c^i(z) = H_{BP}(z,\hat{\omega}_{n-1}^i,\rho^i) \cdot \prod_{\substack{q=1 \\ q \neq i}}^{N} H_{SB}(z,\hat{\omega}_n^q,\rho^q)$$

wherein $\rho$ is the filter width of a band-pass or a stop-band digital filter, fulfilling:

$$\rho^i = \Delta\omega_{BP}$$

$$\rho^q = \Delta\omega_{SB} \quad q \neq i$$

Advantageously, the filter widths equal the band width of the filters. Higher values of band width imply higher filter width values; therefore, the filter can be selected according to the needs.

In a second inventive aspect, the invention provides a computer program comprising computer program code, which, when executed by a computer device, causes the computer device to carry out all the method steps of the first inventive aspect.

This allows the performance by means of any computer device of the present elastic mode cancellation method.

In a third inventive aspect, the invention provides a system comprising a flexible structure and N elastic modes to be cancelled in real time in discrete-time signals which measure the dynamics of the flexible structure and a computer device, the computer device being configured to apply a method for adaptively cancelling in real time N elastic modes in the discrete-time signals according to the first inventive aspect.

In a fourth inventive aspect, the invention provides an aircraft comprising a system according to the third inventive aspect.

Advantageously, the performance of this elastic mode cancellation method applied in the discrete-time signals which measure the dynamics of the flexible structure used in the field of aeronautics provides reliable results.

All the features described in this specification (including the claims, description and drawings) and/or all the steps of the described method can be combined in any combination, with the exception of combinations of such mutually exclusive features and/or steps.

BRIEF DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE PREFERRED EMBODIMENTS

Figure 1:
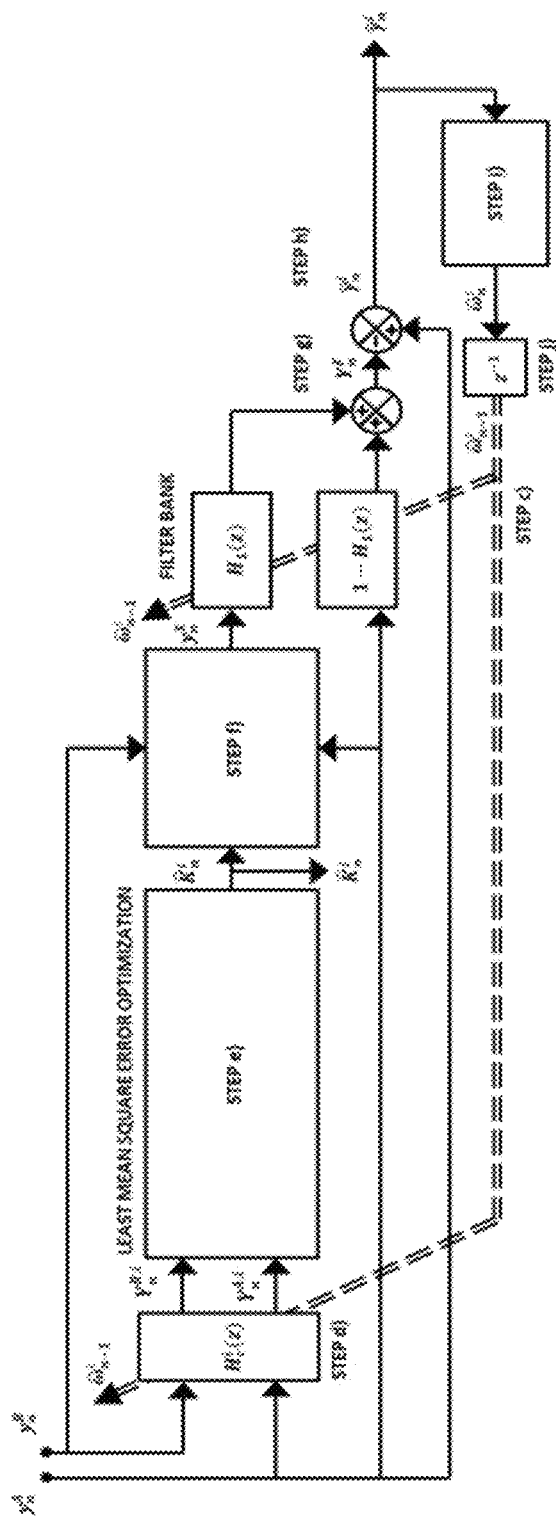
FIG. 1 shows a diagram with the steps of the first block of the method for cancelling elastic modes according to the present invention.

The present description discloses a method for adaptively cancelling in real time N elastic modes in discrete-time signals which measure the dynamics of a flexible structure, the flexible structure having elastic variable characteristics.

Elastic mode cancellation in the discrete-time signals which measure the dynamics of a structure can be addressed either theoretically or experimentally.

When considering theoretical studies, there is the need of performing an analytic solving in order to obtain results for the cancellation of the selected elastic modes.

An example of a theoretical study is disclosed below.

Analytic solving for cancelling N elastic modes in discrete-time signals containing the measured dynamics of a flexible structure.

The theoretical solving is mainly composed by two different steps which are:
identifying the elastic modes characteristics by a collection of estimation kernels, and
providing an extended spatial filter algebraic solver.

Additionally, the theoretical solving estimates, in parallel with the steps, the exogenous boundary condition acting on the system and accordingly configures the constraints applicable to the distributed constrained estimation kernels.

Elastic Modes Estimation Kernels

For cancelling N elastic modes in discrete-time signals which measure the dynamics of a flexible structure with elastic variable characteristics, N elastic modes estimation kernels are required, wherein each kernel is intended to provide an estimate of the elastic modes displacement, and an estimate of $K_n^i$ parameter required to cancel a specific elastic mode i, with $i \in \mathbb{N}^+$: $i \in [1, N]$, given two output measurement discrete-time scalar signals $y^A$ and $y^B$, measured by two measurement sources (A, B) respectively, according to the location of the sources and the characteristics of the structure.

The $n^{th}$ sample $y_n^A$ and $y_n^B$ of the output measurement discrete-time scalar signals $y^A$ and $y^B$ can be expressed in terms of the sensed rigid and elastic system dynamics as $$y_n^A = r_n + \Sigma_{i=1}^N \varphi_n^i(l_A)\eta_n^i + v_n^A$$

$$y_n^B = r_n + \Sigma_{i=1}^N \varphi_n^i(l_B)\eta_n^i + v_n^B$$

where $l_A, l_B \in \mathbb{R}^3$ denote the location vectors of the two measurement sources (A, B) respectively, n a subscript denoting the $n^{th}$ sample of a discrete-time signal, being $n \in \mathbb{N}^+$: $n \in [1, \infty)$ i a generic index referring the elastic mode to be cancelled, $i \in \mathbb{N}^+$: $i \in [1, N]$, $r_n$ is a rigid dynamics output measurement of each active measurement sources (A, B), $\eta_n^i$ is an elastic displacement of each of the elastic modes i, $v_n^A$ and $v_n^B$ are measurement noises of each active measurement source (A, B) respectively, and $\varphi_n^i(l)$ is an elastic mode shape of each of the elastic modes i, according to the location vector l of the active measurement sources (A, B), $l \in \mathbb{R}^3$.

Therefore, the samples $y_n^A$ and $y_n^B$ comprise three different components, which are a rigid dynamics component, an elastic component and a noise component directly related with the measurement sources.

The perfect cancellation parameter, as it is theoretically determined, $K_n^i$ of each elastic mode can be computed imposing that the linear combination of the samples $y_n^A$ and $y_n^B$ results in the suppression of the sensed elastic system dynamics $\varphi_n^i(l_A)\eta_n^i$ of the elastic mode i while maintaining unaltered the sensed rigid dynamics denoted by $r_n$ according to the following expressions $$K_n^i \varphi_n^j(l_A)\eta_n^j + (1 - K_n^i)\varphi_n^j(l_B)\eta_n^j = 0$$

$$K_n^i y_n^A + (1 - K_n^i) y_n^B = = r_n + \sum_{\substack{j=1 \\ j \neq i}}^{N} [K_n^i \varphi_n^j(l_A)\eta_n^j + (1 - K_n^i)\varphi_n^j(l_B)\eta_n^j] + K_n^i v_n^A + (1 - K_n^i) v_n^B$$

Additionally, it is necessary that the elastic mode shape of each of the elastic modes fulfills the following condition:

$$\varphi_n^i(l_A) \neq \varphi_n^i(l_B),$$

According to the previous expressions, the theoretical elastic mode shape cancellation parameter $K_n^i$ per elastic mode i to be cancelled is obtained by means of the following equation $$K_n^i = \frac{\varphi_n^i(l_B)}{\varphi_n^i(l_B) - \varphi_n^i(l_A)}$$

These parameters provide the solution of the theoretical function which allows the cancellation of the selected N elastic modes in discrete-time signals which measure the dynamics of the flexible structure.

Considering the parameters, an analytical solution can be related with an experimental solution of the parameters, namely the estimated parameters $\hat{K}_n^i$.

The relation between the theoretical solution and the experimental solution can be expressed as follows:

$$\hat{K}_n^i = K_n^i + \tilde{\varepsilon}_n^i(\phi_a^i, \phi_B^i, v_n^A, v_n^B)$$

wherein $\tilde{\varepsilon}_n^i$ is the $n^{th}$ sample of a discrete-time error bias function for elastic mode i which depends on the bandwidth power ratios $\phi_A^i$ and $\phi_B^i$ between the rigid dynamic output measurement $r_n$ and the measured elastic displacement of each of the elastic modes i for each active measurement source (A, B) respectively, and also depends on the measurement noises $v_n^A$ and $v_n^B$ of the active measurement source (A, B).

The bandwidth power ratios $\phi_A^i$ and $\phi_B^i$ must fulfill the following requirement in order to minimize the estimation error $\tilde{\varepsilon}_n^i$:

$$\phi_A^i = \frac{\int_{\omega_i - \Delta\omega/2}^{\omega_i + \Delta\omega/2} \sum_{n=-\infty}^{\infty} r_n e^{-j\omega n} d\omega}{\int_{\omega_i - \Delta\omega/2}^{\omega_i + \Delta\omega/2} \sum_{n=-\infty}^{\infty} \varphi_n^i(l_A) \eta_n^i e^{-j\omega n} d\omega} \ll 1$$

$$\phi_B^i = \frac{\int_{\omega_i - \Delta\omega/2}^{\omega_i + \Delta\omega/2} \sum_{n=-\infty}^{\infty} r_n e^{-j\omega n} d\omega}{\int_{\omega_i - \Delta\omega/2}^{\omega_i + \Delta\omega/2} \sum_{n=-\infty}^{\infty} \varphi_n^i(l_B) \eta_n^i e^{-j\omega n} d\omega} \ll 1$$

being:
ω a generic frequency
$\omega_i$ a frequency of the elastic mode i
j an imaginary number equal to $\sqrt{-1}$
Δω a generic frequency bandwidth Conditions required in the previous equations can be always satisfied if Δω is small enough, considering a small enough value that of $\Delta\omega < 0.1\omega_i$.

With these results, a second step is performed considering the actuation of an extended spatial filter algebraic solver, which will finally provide with the output function solution for cancelling the elastic modes using the input discrete-time signals $y^A$ and $y^B$.

However, such a solving for the cancellation of the elastic modes in discrete-time signals is complicated to fulfill, as it is very difficult to distinguish which part of the signals $y^A$ and $y^B$ comes from the measured rigid dynamics of the system, and which part comes from the measured elastic dynamics of the system. This is why there is not immediate obtainment of the different components of the signals ($r_n$, $\Sigma_{i=1}^{N} \varphi_n^i(l_A) \eta_n^i$ and $v_n^A$ for measurement source A) in order to select the elastic component for cancelling it, obtaining as a result the measured rigid dynamics component in signals $y^A$ and $y^B$ with zero phase-loss and attenuation in addition with the measurement noises.

Therefore, a theoretical solution for the cancelling of elastic modes is complicated to perform. On the contrary, the present method provides for a real-time solver which allows the cancellation of the elastic modes according to different changing conditions.

Estimate solving for cancelling in real time N elastic modes in discrete-time signals containing the measured dynamics of a flexible structure.

The present method for cancelling elastic modes in discrete-time signals is divided in two main blocks, wherein different steps are fulfilled in order to obtain a final equation which allows the cancellation of the elastic modes.

FIG. 1 shows a diagram with the steps of the first block for the method of canceling N elastic modes.

As it can be observed, the $n^{th}$ sample $y_n^A$ and $y_n^B$ of two output measurement discrete-time scalar signals $y^A$ and $y^B$ are supplied to the conditioning filter $H_c^i$ in order to obtain filtered measurement outputs for the elastic mode i, $Y^{A,i}$ and $Y^{B,i}$.

These solutions allow the performance of a least mean square error optimization in order to obtain an $n^{th}$ sample of an estimated cancellation parameter per elastic mode i to be cancelled, $\hat{K}_n^i$.

The obtainment of these parameters is shown in FIG. 1 by means of a label "STEP e)."

The estimated cancellation parameter along with the $n^{th}$ sample $y_n^A$ will provide the $n^{th}$ sample $y_n^X$ of a discrete-time scalar signal $y^X$.

The method uses a complementary filter bank which performs two different operations. The first operation is the filtering of the $n^{th}$ sample of a discrete-time scalar signal, namely $y_n^X$, by means of a second order band-pass filter centered in the natural frequency estimate $\hat{\omega}_{n-1}^i$ of the elastic mode i. The second operation is the filtering by means of the former complementary filter of the $n^{th}$ sample $y_n^A$.

In this preferred embodiment, the signal supplied in the mentioned steps is the $n^{th}$ sample $y_n^A$ as shown in FIG. 1.

The solution of the two filtering steps is used for obtaining a filtered discrete-time scalar signal $Y^F$, being its $n^{th}$ sample, namely $Y_n^F$.

This $n^{th}$ sample of the filtered discrete-time scalar signal, $Y_n^F$ along with the $n^{th}$ sample $y_n^A$, provides an $n^{th}$ sample with of an estimate of the mode displacements for each elastic mode i, $\hat{\gamma}_n^i$. This is shown in FIG. 1 by means of label "STEP h)."

In parallel, the results of the $n^{th}$ sample of an estimate of the mode displacements for each elastic mode i, $\hat{\gamma}_n^i$, are used as input to a frequency tracking module, the tracking module consisting of any algorithm that computes the frequency at which a signal has its maximum of power spectral density, for obtaining an adjusted value of $\hat{\omega}_{n-1}^i$, namely $\hat{\omega}_n^i$ which will be saved to be used in later steps of the method. This is shown in FIG. 1 by means of a label "STEP i)" and label "STEP j)" respectively.

The results of these adjusted natural frequency estimates affect the filtering transfer functions, therefore the filters used in the different step of the methods.

Figure 2:
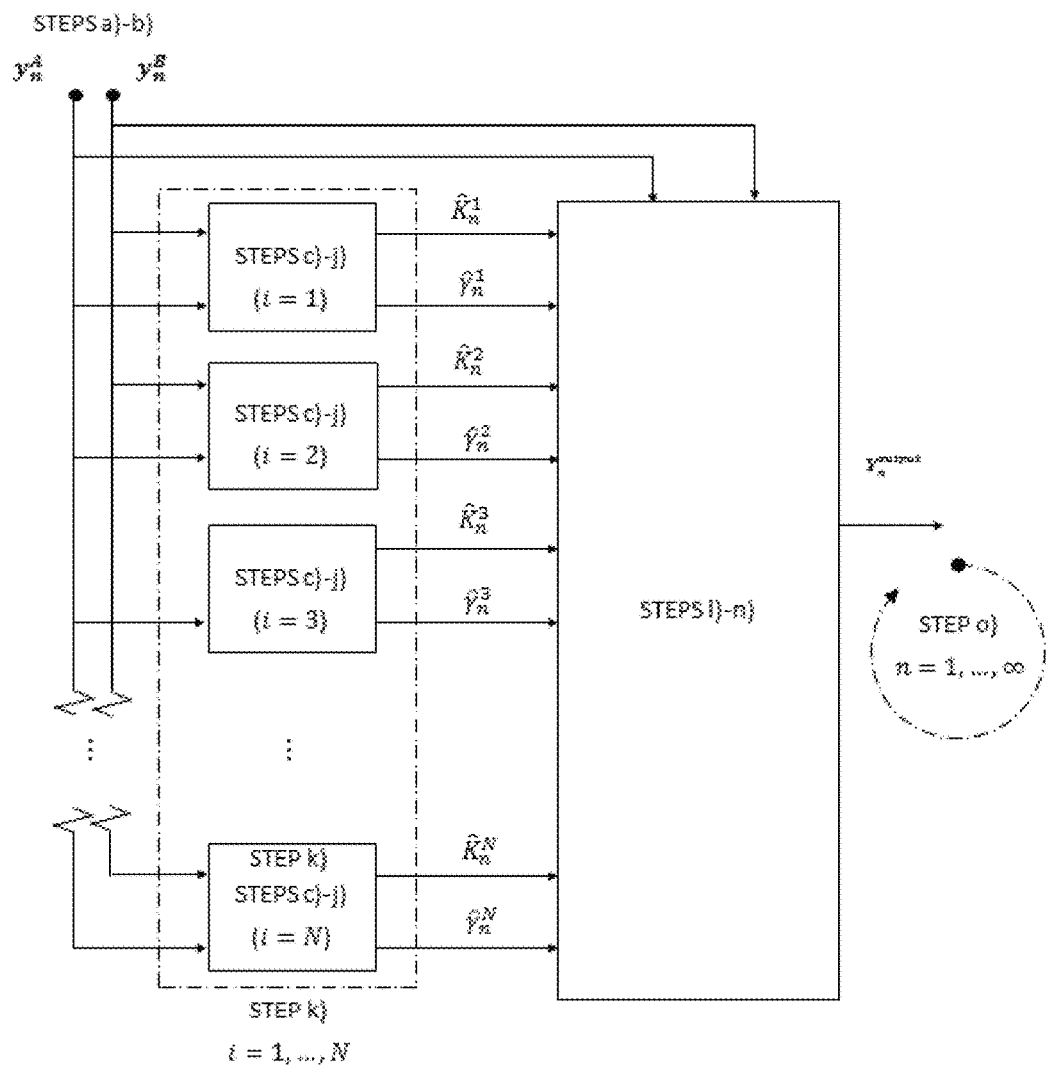
FIG. 2 shows a diagram with the complete method according to a first embodiment of the present invention.

FIG. 2 shows a diagram with the complete method according to a first embodiment of the present invention.

As it can be observed, the totality of the steps of the method are shown in the diagram along with the location of the looping steps which allow the method to readjust considering the changes of the conditions of the elastic system structure.

The diagram shows how, starting with the $n^{th}$ sample $y_n^A$ and $y_n^B$ of two output measurement discrete-time scalar signals, steps a) and b) of the method, the rest of the steps are fulfilled obtaining the needed results $\hat{K}_n^i$ and $\hat{\gamma}_n^i$.

The conditioning filter $H_c^i$ used in this particular embodiment is a parametric band-pass digital filter centered at the frequency estimate $\hat{\omega}_{n-1}^i$ of the elastic mode i provided in each of the different steps c) performed for each of the elastic modes i, which can be seen in FIG. 2.

Additionally, the diagram shows the second block of the method, which ends in the obtainment of $Y_n^{output}$, function which allows the cancellation of the elastic modes components in the discrete-time signals $y^A$ and $y^B$.

Figure 3:
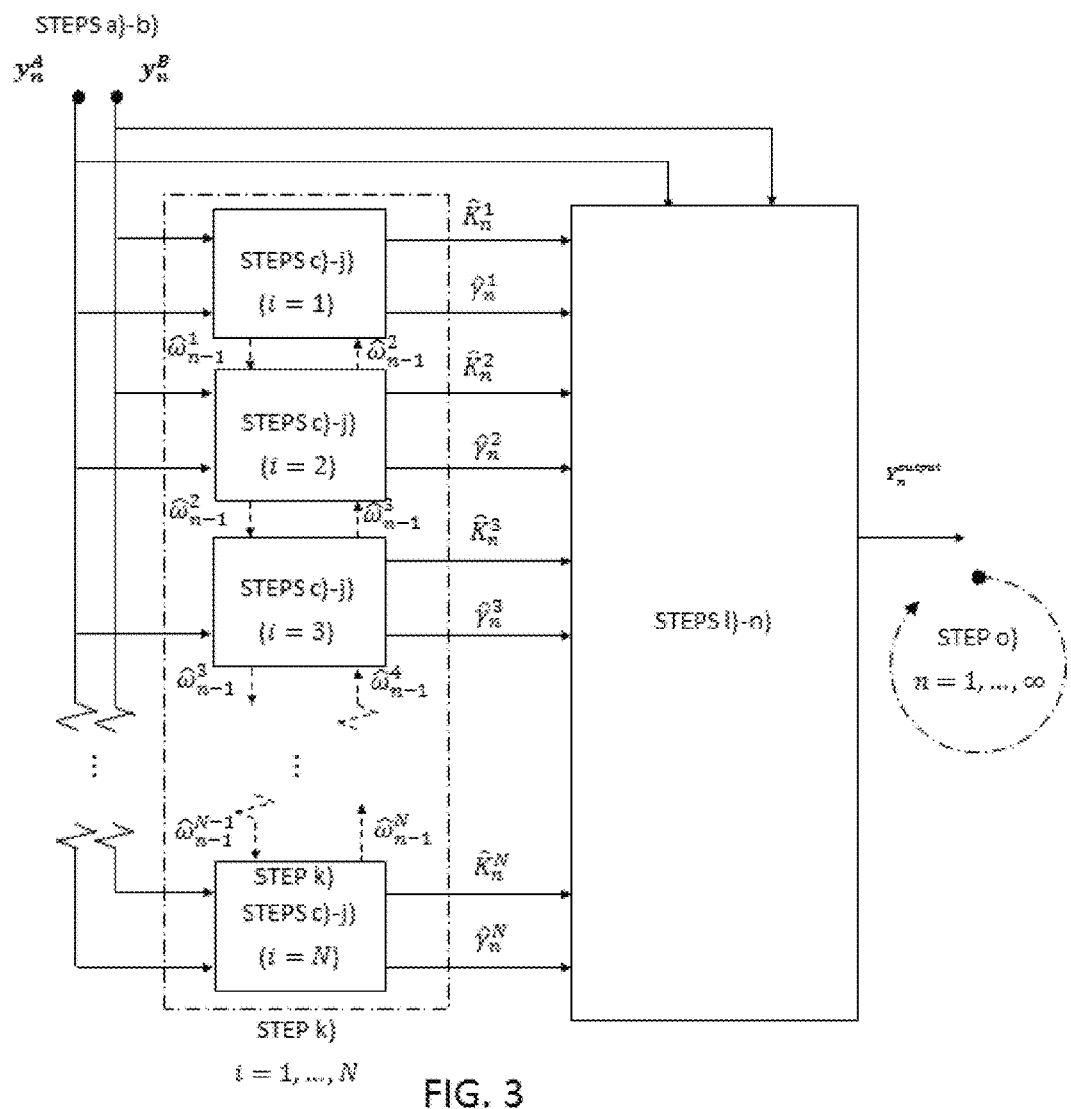
FIG. 3 shows a diagram with the complete method according to a second embodiment of the present invention.

FIG. 3 shows the diagram shown in FIG. 2 considering a particular composition of the conditioning filter $H_c^i$.

The conditioning filter $H_c^i$ used in this particular embodiment is a combination of a narrow band-pass filter (BP) centered at $\hat{\omega}_{n-1}^i$ and two narrow stop-band filters (SB) centered at $\hat{\omega}_{n-1}^{i-1}$ and $\hat{\omega}_{n-1}^{i+1}$ for i=2 ... N−1, and for the particular case where i=1 it is a combination of a narrow band-pass filter (BP) centered at $\hat{\omega}_{n-1}^i$ and one narrow stop-band filter (SB) centered at $\hat{\omega}_{n-1}^2$, and for the particular case where i=N it is a combination of a narrow band-pass filter (BP) centered at $\hat{\omega}_{n-1}^N$ and one narrow stop-band filter (SB) centered at $\hat{\omega}_{n-1}^{N-1}$.

FIG. 3 shows in each of the different steps c) performed for each of the elastic modes i how the countered-loop from i=1 to i=N affects the present filter.

As it can be observed, step c) is affected every time by the corresponding natural frequencies estimate of the mode i and the modes i−1, i+1.

Figure 4:
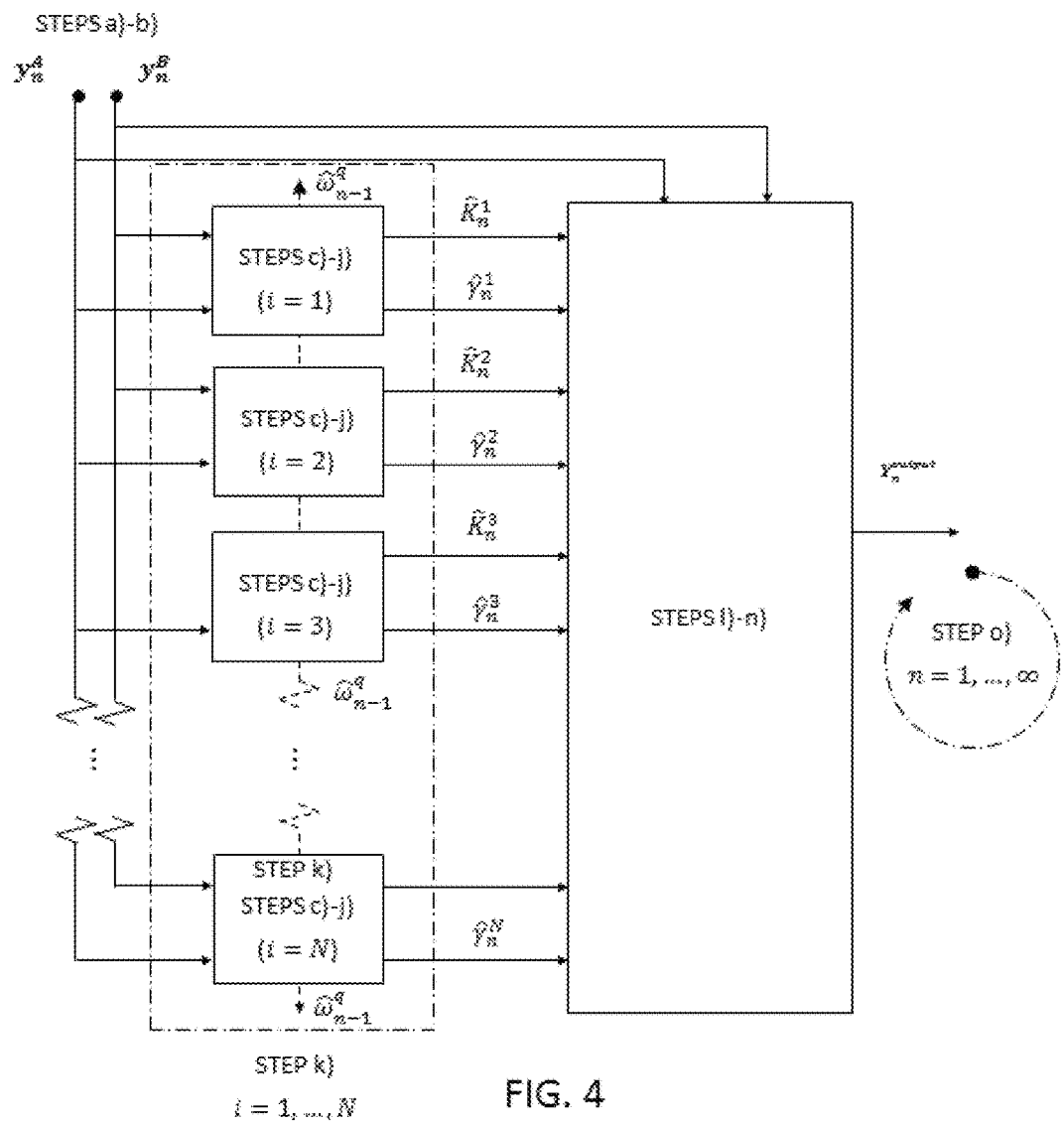
FIG. 4 shows a diagram with the complete method according to a third embodiment of the present invention.

FIG. 4 shows the diagram shown in FIGS. 2 and 3 considering a particular composition of the conditioning filter $H_c^i$.

The conditioning filter $H_c^i$ used in this particular embodiment is a combination of a narrow band-pass filter (BP) centered at $\hat{\omega}_{n-1}^i$ and N−1 narrow stop-band filters (SB) centered at $\hat{\omega}_{n-1}^q$ being $q \in \mathbb{N}^+$: $\{q \in [1, N] | q \neq i\}$.

FIG. 4 shows in each of the different steps c) performed for each of the elastic modes i how the countered-loop from i=1 to i=N affects the present filter $H_c^i$.

As it can be observed, step c) is affected every time by the corresponding natural frequencies estimate of the mode i and the mode q being $q \in \mathbb{N}^+$: $\{q \in [1, N] | q \neq i\}$.

Particular Example

Figure 5:
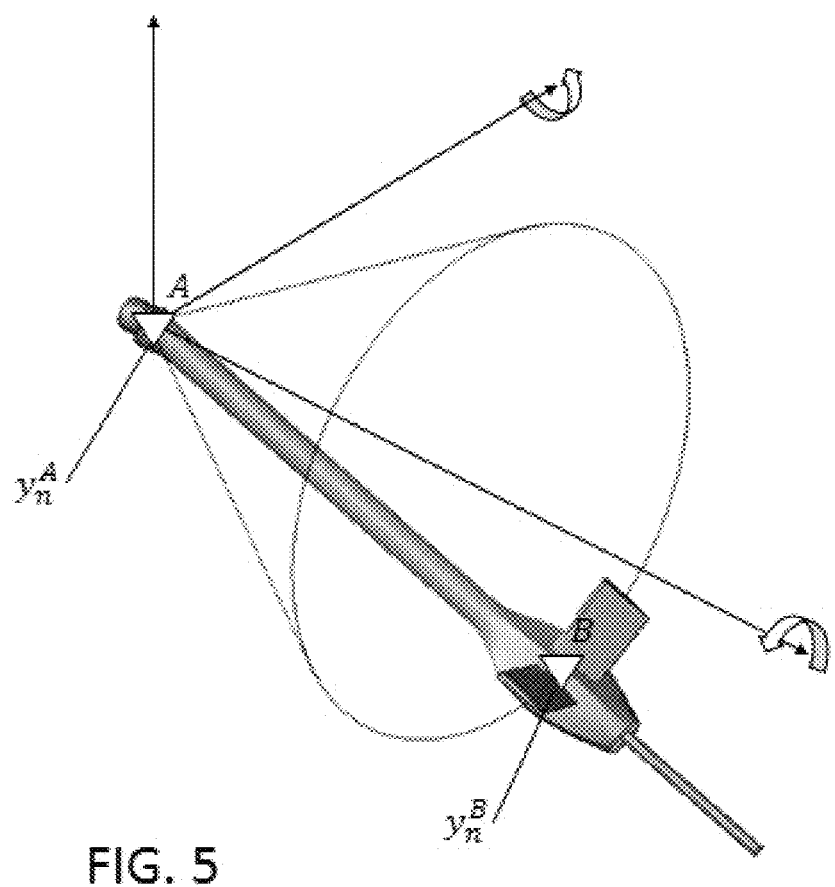
FIG. 5 shows a particular embodiment of a flying boom of a tanker aircraft on which the elastic mode cancellation method of the present invention is applied to the feedback signals of the Control Laws.

FIG. 5 shows a flying boom of a tanker aircraft (A330 MRTT) comprising two active measurement sources, which are sensor A and sensor B. The flying boom comprises elastic mode shapes and undamped elastic mode frequencies which experience great variations during transitions from free air to coupled condition and vice versa due to the discrete changes in the exogenous boundary conditions acting on the structure.

For testing the method of the present invention, the method has been applied on the flying boom Control Laws, obtaining as results the adaptive cancellation in real time of the first two elastic modes in the discrete-time signals which measure the dynamics of the flying boom structure, therefore being the parameter N=2.

The present method can be implemented as part of the Control Laws of any flexible system with more than one sensor located along the structure. Additionally, the present method can be used not only to filter the elastic component in the Control Laws feedback signals, but also to control the elastic dynamics by using parallel control laws with a feedback composed by the elastic modes displacements identified by the estimation kernels, or simply by using the discrete-time signal $y^A - Y^{output}$ and its derivatives as control variables.

The present invention includes a non-transitory computer-readable medium having computer-executable program instructions stored thereon, comprising instructions for the implementation, by a processor of a computing device, of the method described above, when the program is executed by the processor.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for adaptively cancelling, in real time, N elastic modes in discrete-time signals which measure the dynamics of a flexible structure, the flexible structure having elastic variable characteristics, and the method comprising two main blocks:

a) a first block of the method comprising the following steps: providing a total number $N \in \mathbb{N}^+$ of elastic modes to be cancelled, being i a generic elastic mode to be cancelled, $i \in \mathbb{N}^+$: $i \in [1, N]$, and two active measurement sources (A, B) which location is respectively defined by location vectors $l_A$ and $l_B$, where $l_A$, $l_B \in \mathbb{R}^3$, b) sampling two output measurement discrete-time scalar signals $y^A$ and $y^B$ of the dynamics of the flexible structure, being $y_n^A$ and $y_n^B$ the $n^{th}$ sample of the respective signal measured by the two active measurement sources (A, B), said sampling being performed with a sample time $\Delta t$, and the $n^{th}$ sample of a signal being $n \in \mathbb{N}^+$: $n \in [1, \infty)$, c) providing natural frequency estimate $\hat{\omega}_{n-1}^i$ of the elastic mode i, and an integer parameter $M_{n-1}^i$, being said frequency estimate and the parameter respectively:

c1) if n=1; then $\hat{\omega}_{n-1}^i = \hat{\omega}_0^i$; $M_{n-1}^i = M_0^i$, being $M_0^i$ an integer multiple of $$\left\lfloor \frac{2\pi}{\hat{\omega}_0^i \cdot \Delta t} \right\rfloor,$$

being the method applied for the first time, c2) if n≠1; then $\hat{\omega}_{n-1}^i = \hat{\omega}_{n-1}^i$; $M_{n-1}^i = M_{n-1}^i$, being $M_{n-1}^i$ an integer multiple of $$\left\lfloor \frac{2\pi}{\hat{\omega}_{n-1}^i \Delta t} \right\rfloor,$$

d) filtering the output measurement discrete-time scalar signals $y^A$ and $y^B$, by means of a conditioning filter $H_c^i$, obtaining filtered measurement outputs for the elastic mode i, $Y^{A,i}$ and $Y^{B,i}$, calculated by the following expressions in the Z-domain:

$$Y^{A,i}(z) = H_c^i(z) y^A(z)$$

$$Y^{B,i}(z) = H_c^i(z) y^B(z)$$

wherein $H_c^i(z)$ corresponds to the transfer function in the Z-domain of the conditioning filter $H_c^i$, said conditioning filter being a parametric band-pass digital filter centered at the frequency estimate $\hat{\omega}_{n-1}^i$ of the elastic mode i provided in step c), e) obtaining an $n^{th}$ sample of an estimated cancellation parameter per elastic mode i to be cancelled, $\hat{K}_n^i$, according to the following expression:

$$\hat{K}_n^i = \frac{\sum_{j=n-M_{n-1}^i+1}^{n} \left( (Y_j^{B,i})^2 - Y_j^{A,i} Y_j^{B,i} \right)}{\sum_{j=n-M_{n-1}^i+1}^{n} \left( (Y_j^{A,i})^2 + (Y_j^{B,i})^2 - 2 Y_j^{A,i} Y_j^{B,i} \right)}$$

wherein the value of the parameter $M_{n-1}^i$ corresponds to the value provided in step c), f) generating an $n^{th}$ sample of a discrete-time scalar signal $y^X$, namely $y_n^X$, according to the following expression:

$$y_n^X = \hat{K}_n^i y_n^A + (1 - \hat{K}_n^i) y_n^B$$

g) obtaining a filtered discrete-time scalar signal $Y^F$ by means of the following bank filtering expression in the Z-domain:

$$Y^F(z) = y^X(z) H_1(z) + y^A(Z)(1 - H_1(z))$$

wherein $H_1$ is a second order band-pass filter centered in the natural frequency estimate $\hat{\omega}_{n-1}^i$ of the elastic mode i provided in step c), and obtaining directly from the filtered discrete-time scalar signal $Y^F$ an $n^{th}$ sample of the filtered discrete-time scalar signal $Y^F$, namely $Y_n^F$, h) obtaining an $n^{th}$ sample of an estimate of the mode displacements for each elastic mode i, $\hat{\gamma}_n^i$, by means of the following expression:

$$\hat{\gamma}_n^i = y_n^A - Y_n^F$$

i) calculating an adjusted value of $\hat{\omega}_{n-1}^i$, namely $\hat{\omega}_{n-1}^i$, by introducing the value of $\hat{\gamma}_n^i$ from step h) in a frequency tracking module, obtaining the adjusted value $\hat{\omega}_{n-1}^i$, j) saving the adjusted value $\hat{\omega}_n^i$ calculated in step i)

k) performing, from i=1 to i=N, the steps c) to j), the second block of the method comprising the following steps:

l) inheriting from step h) the values of the $n^{th}$ sample of the estimate of the mode displacements, $\hat{\gamma}_n^i$ for each elastic mode i, m) obtaining an $n^{th}$ sample of an elastic mode cancellation output function $Y_n^{output}$ according to the following expression:

$$Y_n^{output} =$$

$$\theta_n^1 y_n^A + \theta_n^2 y_n^B + \sum_{j=1}^{N-1} \theta_n^{j+2} \hat{\beta}_n^j == \begin{bmatrix} y_n^A & y_n^B & \hat{\beta}_n^1 & \hat{\beta}_n^2 & \ldots & \hat{\beta}_n^{N-1} \end{bmatrix} \begin{bmatrix} \theta_n^1 \\ \vdots \\ \theta_n^N \\ \theta_n^{N+1} \end{bmatrix}$$

said $n^{th}$ sample of the elastic mode cancellation output function $Y_n^{output}$ being obtained by the following steps:

m1) calculating the inverse of an estimated spatial filter matrix $\hat{\Phi}$ by the following expression:

$$\hat{\Phi}^{-1} = \left( \begin{bmatrix} 1 & 1 & 1 & 1 \\ \frac{\hat{K}_n^1}{\hat{K}_n^1 - 1} & \ldots & \frac{\hat{K}_n^N}{\hat{K}_n^N - 1} & 1 \\ 1 - \lambda_n^{1,1} & \ldots & 1 - \lambda_n^{N,1} & 1 \\ \vdots & \ddots & \vdots & \ldots \\ 1 - \lambda_n^{1,N-1} & \ldots & 1 - \lambda_n^{N,N-1} & 1 \end{bmatrix}^T \right)^{-1}$$

wherein:

$\hat{K}_n^i$ are values of the $n^{th}$ sample of the estimated cancellation parameter for each elastic mode i to be cancelled, inherited from step e)

$\lambda_n^{i,p}$, $p \in \mathbb{N}^+$: $p \in [1, N-1]$; $i \in \mathbb{N}^+$: $i \in [1, N]$, is an adjustable discrete-time parameter for each elastic mode i, selected to achieve a non-singular spatial filter matrix $\hat{\Phi}$, m2) calculating a spatial filter parameter vector $\theta_n \in \mathbb{R}^{N+1}$, wherein:

$$\theta_n = \begin{bmatrix} \theta_n^1 \\ \vdots \\ \theta_n^N \\ \theta_n^{N+1} \end{bmatrix} = \hat{\Phi}^{-1} \begin{bmatrix} 0 \\ \vdots \\ 0 \\ 1 \end{bmatrix}$$

m3) generating a set of N−1 parametric discrete-time virtual signals $\hat{\beta}^p$, being $\hat{\beta}_n^p$ the $n^{th}$ sample of the virtual signals $\hat{\beta}^p$, being $p \in \mathbb{N}^+$: $p \in [1, N-1]$, said $n^{th}$ sample of the virtual signals $\hat{\beta}_n^p$ configured for complementing $y_n^A$ and $y_n^B$ according to the following expression:

$$\hat{\beta}_n^p = y_n^A - \sum_{i=1}^{N} \lambda_n^{i,p} \hat{\gamma}_n^i$$

m4) substituting in the elastic mode cancellation output function $y_n^{output}$ expression the values obtained in the previous steps k1)-k3), obtaining the value of the elastic mode cancellation output function $Y_n^{output}$ $$Y_n^{output} =$$

$$\theta_n^1 y_n^A + \theta_n^2 y_n^B + \sum_{j=1}^{N-1} \theta_n^{j+2} \hat{\beta}_n^j == \begin{bmatrix} y_n^A & y_n^B & \hat{\beta}_n^1 & \hat{\beta}_n^2 & \ldots & \hat{\beta}_n^{N-1} \end{bmatrix} \begin{bmatrix} \theta_n^1 \\ \vdots \\ \theta_n^N \\ \theta_n^{N+1} \end{bmatrix}$$

n) cancelling the elastic modes i by means of the elastic mode cancellation output function $Y_n^{output}$, o) performing, from n=1 to n=∞, the steps b) to n), introducing the saved adjusted $\hat{\omega}_n^i$ values of step j) in step c).

2. The method for adaptively cancelling in real time N elastic modes in discrete-time signals according to claim 1, wherein the conditioning filter $H_c^i$ of step d) is a combination of a narrow band-pass filter (BP) centered at $\hat{\omega}_{n-1}^i$ and one or two narrow stop-band filters (SB) centered at $\hat{\omega}_{n-1}^{i-1}$ and $\hat{\omega}_{n-1}^{i+1}$, and wherein $H_c^i(z)$ is the transfer function in the Z-domain of the conditioning filter $H_c^i$ corresponding to the following expression:

if $i=1$ $H_c^i(z)=H_{BP}(z,\hat{\omega}_{n-1}^i)H_{SB}(z,\hat{\omega}_{n-1}^{i+1})$ else, if $i=2,\ldots,N-1$ $H_c^i(z)=H_{BP}(z,\hat{\omega}_{n-1}^i)H_{SB}(z,\hat{\omega}_{n-1}^{i-1})H_{SB}(z,\hat{\omega}_{n-1}^{i+1})$ else, if $i=N$ $H_c^i(z)=H_{BP}(z,\hat{\omega}_{n-1}^i)H_{SB}(z,\hat{\omega}_{n-1}^{i-1})$ and wherein step c) of the method further comprises providing natural frequency estimates $\hat{\omega}_{n-1}^{i-1}$ and $\hat{\omega}_{n-1}^{i+1}$ of the elastic mode i−1 and i+1, being:

c1) if n=1; then $\hat{\omega}_{n-1}^i=\hat{\omega}_0^i$; $\hat{\omega}_{n-1}^{i-1}=\hat{\omega}_0^{i-1}$; $\hat{\omega}_{n-1}^{i+1}=\hat{\omega}_0^{i+1}$; $M_{n-1}^i=M_0^i$, being $M_0^i$ an integer multiple of $\left\lfloor \dfrac{2\pi}{\hat{\omega}_0^i \Delta t} \right\rfloor$, being the method applied for the first time, c2) if n≠1; then $\hat{\omega}_{n-1}^i=\hat{\omega}_{n-1}^i$; $\hat{\omega}_{n-1}^{i-1}=\hat{\omega}_{n-1}^{i-1}$; $\hat{\omega}_{n-1}^{i+1}=\hat{\omega}_{n-1}^{i+1}$; $M_{n-1}^i=M_{n-1}^i$, being $M_{n-1}^i$ an integer multiple of $\left\lfloor \dfrac{2\pi}{\hat{\omega}_{n-1}^i t} \right\rfloor$.

3. The method for adaptively cancelling in real time N elastic modes in discrete-time signals according to claim 2 wherein the narrow band-pass filter is defined by a bandwidth $\Delta\omega_{BP}$ and the one or two narrow stop-band filters are defined by a bandwidth $\Delta\omega_{SB}$ respectively, following the expression:

if $i=1$ $H_c^i(z)=H_{BP}(z,\hat{\omega}_{n-1}^i,\rho^i)H_{SB}(z,\hat{\omega}_{n-1}^{i+1},\rho^{i+1})$ else, if $i=2,\ldots,N-1$ $H_c^i(z)=H_{BP}(z,\hat{\omega}_{n-1}^i,\rho^i)H_{SB}(z,\hat{\omega}_{n-1}^{i-1},\rho^{i-1})$
$H_{SB}(z,\hat{\omega}_{n-1}^{i+1},\rho^{i+1})$ else, if $i=N$ $H_c^i(z)=H_{BP}(z,\hat{\omega}_{n-1}^i,\rho^i)H_{SB}(z,\hat{\omega}_{n-1}^{i-1},\rho^{i-1})$ wherein $\rho$ is the filter width of the conditioning filter $H_c^i$, fulfilling:

$\rho^i=\Delta\omega_{BP}$ $\rho^{i-1}=\rho^{i+1}=\Delta\omega_{SB}$.

4. The method for adaptively cancelling in real time N elastic modes in discrete-time signals according to claim 1, wherein the conditioning filter $H_c^i$ of step d) is a combination of a narrow band-pass filter (BP) centered at $\hat{\omega}_{n-1}^i$ and N−1 narrow stop-band filters (SB) centered at $\hat{\omega}_{n-1}^q$ being $q \in \mathbb{N}^+$: ($q \in [1, N] | q \neq i$), being $H_c^i(z)$ the transfer function in the Z-domain of the conditioning filter $H_c^i$ corresponding to the following expression:

$$H_c^i(z) = H_{BP}(z, \hat{\omega}_{n-1}^i) \cdot \prod_{\substack{q=1 \\ q \neq i}}^{N} H_{SB}(z, \hat{\omega}_n^q)$$

and wherein step c) of the method further comprises providing natural frequency estimate $\hat{\omega}_{n-1}^i$ of the elastic mode i, and natural frequencies estimates of the rest of the elastic modes $\hat{\omega}_{n-1}^q$, with $q \in \mathbb{N}^+$: $\{q \in [1, N] | q \neq i\}$, being:

c1) if n=1; then $\hat{\omega}_{n-1}^i=\hat{\omega}_0^i$; $\hat{\omega}_{n-1}^q=\hat{\omega}_0^q$ with $q \in \mathbb{N}^+$: $\{q \in [1, N] | q \neq i\}$; $M_{n-1}^i=M_0^i$, being $M_0^i$ an integer multiple of $\left\lfloor \dfrac{2\pi}{\hat{\omega}_0^i \Delta t} \right\rfloor$, being the method applied for the first time, c2) if n≠1; then $\hat{\omega}_{n-1}^i=\hat{\omega}_{n-1}^i$; $\hat{\omega}_{n-1}^q=\hat{\omega}_{n-1}^q$ with $q \in \mathbb{N}^+$: $\{q \in [1, N] | q \neq i\}$; $M_{n-1}^i=M_{n-1}^i$, being $M_{n-1}^i$ an integer multiple of $\lfloor 2\pi/\hat{\omega}_{n-1}^i \Delta t \rfloor$, $\left\lfloor \dfrac{2\pi}{\hat{\omega}_{n-1}^i t} \right\rfloor$.

5. The method for adaptively cancelling in real time N elastic modes in discrete-time signals according to claim 4 wherein the narrow band-pass filter is defined by a bandwidth $\Delta\omega_{BP}$ and the N−1 narrow stop-band filters are defined by a bandwidth $\Delta\omega_{SB}$ respectively, following the expression:

$$H_c^i(z) = H_{BP}(z, \hat{\omega}_{n-1}^i \rho^i) \cdot \prod_{\substack{q=1 \\ q \neq i}}^{N} H_{SB}(z, \hat{\omega}_n^q, \rho^q)$$

wherein $\rho$ is the filter width of a band-pass or a stop-band filter, fulfilling:

$\rho^i=\Delta\omega_{BP}$ $\rho^q=\Delta\omega_{SB}$ $q \neq i$.

6. A non-transitory computer-readable medium having computer-executable program instructions stored thereon, comprising instructions for the implementation, by a processor of a computing device, of the method according to claim 1, when said program is executed by said processor.

7. A system comprising:

a flexible structure and N elastic modes to be cancelled in real time in discrete-time signals which measure the dynamics of the flexible structure, and a computer device, the computer device being configured to apply a method for adaptively cancelling in real time N elastic modes in said discrete-time signals according to claim 1.

8. An aircraft comprising a system according to claim 7.

\* \* \* \* \*